United States Patent

Russell et al.

[15] 3,681,773

[45] Aug. 1, 1972

[54] GRAPHICAL PLOTTER

[72] Inventors: Lewis B. Russell, Orange; William F. Kelly, Fullerton, both of Calif.

[73] Assignee: Marine Sciences Corporation, Orange, Calif.

[22] Filed: April 21, 1969

[21] Appl. No.: 817,994

[52] U.S. Cl...................346/29, 250/219 D, 318/562, 318/569, 318/571, 340/172.5

[51] Int. Cl...................G01d 9/40

[58] Field of Search..................346/29, 139, 32, 31; 250/219 Q, 219 I, 219 F, 216, 202; 340/172.5; 235/151, 15.11; 33/1 M; 318/569, 562, 571

[56] References Cited

UNITED STATES PATENTS

| | | | |
|---|---|---|---|
| 2,130,561 | 9/1938 | Pratt | 350/190 X |
| 3,473,157 | 10/1969 | Little et al. | 340/172.5 |
| 2,948,580 | 8/1960 | Eisenstark | 346/8 |
| 3,113,313 | 12/1963 | Roberts | 346/8 X |
| 3,293,651 | 12/1966 | Gerber et al. | 346/29 |
| 3,315,266 | 4/1967 | Lapinski | 346/32 |
| 3,403,263 | 9/1968 | Hargens | 250/202 |

*Primary Examiner*—Joseph W. Hartary
*Attorney*—John E. Wagner

[57] ABSTRACT

An improved two axis graphical plotter designed particularly for use in remote terminals of time shared computer systems is disclosed. It may be connected via any suitable digital transmission system and produce curves or printed matter under command of a digital computer. It employs a digital position servo system and operates by whole word readout of pen position. A novel optical position coding system is disclosed employing a pair of partially transparent code belts carrying a recording pen and an optical system employing the belt rollers as optical members. The computer time required to command many common pen movements is reduced by means of a novel slant mode of operation. Both the X and Y positioning systems employ digital servo loops with position data derived by the use of a minimum ambiguity code for accurate readout and converted to natural binary for comparison with incoming binary commands. The plotter includes a novel velocity profiler to produce near optimum pen movement.

18 Claims, 11 Drawing Figures

INVENTORS.
WILLIAM F. KELLY
LEWIS B. RUSSELL
BY John E. Wagner
ATTORNEY

GRAPHICAL PLOTTER

BACKGROUND OF THE INVENTION

Heretofore computer operated graphical or XY plotters have characteristically employed drive systems including stepper motors for incrementally moving a recording pen under pulse commands. Usually pen position is determined by memory circuit or mechanical count up-count down devices. In such systems errors are cummulative or at least result in offset errors. Such systems must generate lines and curves which are not parallel to either the vertical or horizontal axis by continuously connecting successive horizontal and vertical increments each individually commanded by the external digital computer. Some plotters have used positional servo loops for error correction and some have included belt mounting for pen carriages.

In order to achieve a significant advance in the state of the art, a unique electro-opto-mechanical pen drive and whole word position encoding system is herein disclosed. This system allows for higher plotting speeds and more reliable operation than any system presently available due to its simplified mechanical design and set of unique digital electronics in combination with a novel pen drive and optical true position encoding and readout system.

The opto-mechanical system along with a complementary set of decoding and servo electronics, utilizing optimal control techniques, affords a graphic plotter capable of producing high quality hard copy plots in the shortest time possible, especially in remote terminal applications.

The two major areas of concern in achieving minimum plotting time are, (1) minimizing the time required to generate and transmit plotting instructions to the plotter which serve as both mode control commands and commanded position data, (2) minimizing the time required by the plotter to precisely execute the received instructions.

Although the two areas are related, the first is centered on the coding of the graphical operations in an optimal manner for transmission over a low band pass line to the plotter. Solutions in the second area are directed toward the electromechanical realization of a "stylus" or pen drive with the highest practical writing speed while under precise position control.

First, the plotter of this invention utilizes a coding structure which includes whole word "addressing" of X and Y coordinate positions, delta or incremental motions from current X and Y coordinate positions, and the feature of easily and naturally instructing the plotter to draw slanted lines. Further, the instructions are formatted into character type instructions such that they can be transmitted efficiently over the same channels as teletype information. The advantages of this coding structure are that either the end points of long line segments (including slanted lines) or the coordinate delta lengths in the case of short lines are determined and transmitted by the computer to the plotter. In this way, both the time required by the computer to command a plot and the amount of data to be transmitted are minimized.

An auxiliary benefit from the use of a whole word instruction format is the automatic recovery from an error introduced in data transmission, upon the receipt of the next whole word instruction.

Inherent in a code of this type is a wide disparity between the time instructions are received by the plotter and the time required to execute the instructions. Therefore, it is necessary for the plotter to operate asynchronously with the input data stream, thereby permitting both the transmission of instructions and the plotting operations to be carried out independently at their maximum respective rates. This is accomplished through the use of a buffer memory in the input data stream which stores incoming data at maximum transmission rates and outputs instructions to the plotter at maximum execution rates. The use of a buffermemory further results in vastly simplified computer operational and programming requirements.

The requirement for high writing speed with precise position control is satisfied through the use of three complementary techniques.

The first is to arrange the two axis pen drive in the form of two very high gain position control loops allowing for simultaneous positive control of pen position in both axes at all times. Thus, position commands for slanted lines can be converted to continuous precisely drawn lines.

The second technique is to provide coordinated position commands to the servos at all times. These commands are digitally generated in such a way that all of the X and Y coordinate whole word positions along a line to be drawn are arithmetically established and are used in the proper sequence as commands to the servo.

The third technique is to arrange that the drive motors are used at or near their maximum acceleration at all times, but at no time in excess of their capability. Servo, hence, motor control is basically via position commands. Thus, it is necessary to control the rate of change of position commands in such a way that the resulting pen velocities and accelerations are near, but never exceed, motor capabilities. The mechanism developed to perform this control is designated a "-velocity profiler". Certain servo problems such as pen overshoot are eliminated through optimal design of the velocity profiler.

These three techniques in combination with both a highly efficient coding system and a reliable low inertia optomechanical drive and position encoding and readout system satisfy the requirement for a simplified high speed X-Y plotting system.

BRIEF STATEMENT OF THE INVENTION

The graphical or XY plotter in accordance with this invention employs a pair of optical coding belts carrying coded positional information on a portion of their surface. One such belt, for convenience termed the X belt, transports a carriage supporting the Y belt and a recording pen. Each belt has an individual drive motor.

A closed servo loop using optical position detection and multiplexed position commands from a decoder and control circuit controls the drive motors.

The optical position readout consists of a precise and novel arrangement of coding belt, photocells, light sources, and optical system including the belt rollers. Slant lines and curve segments (approximated by slant lines) are generated by commanding the ends points only. The plotter internally generates the X and Y axis drive commands to the servo by arithmetically deriving all of the intervening points proportionally to the slope of the desired line segment as established by the vertical and horizontal change in the end points.

The plotter of this invention employs whole word readout of the actual or "true" pen position in both axes resulting in reduction of position error common to other plotters. Continuous movement under the control of the servo loop provides continuous curve and slant line drawing without the stairstep characteristic of stepper motor driven plotters.

In order to achieve minimum plotting time, the pen velocity is servo controlled to an internally generated optimum velocity profile which is mathematically derived in a velocity profiler. This profiler, in conjunction with the servo loop, increases the pen velocity optimally to maximum speed and then decreases the pen velocity as a function of distance to go in order to avoid pen overshoot.

DESCRIPTION OF THE DRAWINGS

This invention may be more clearly understood from the following detailed description and by reference to the drawing in which.

DETAILED DESCRIPTION OF THE INVENTION

Figure 1:
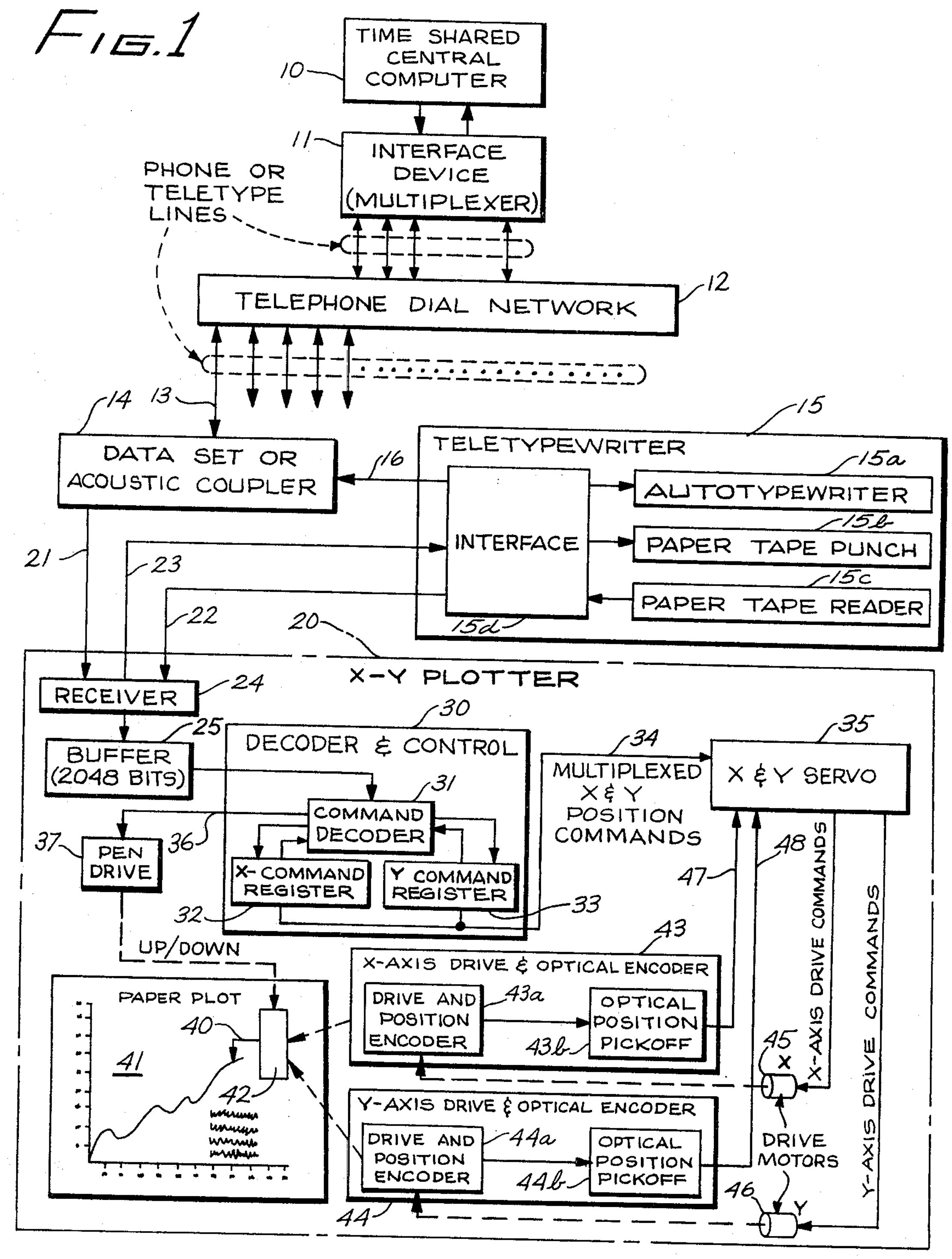
FIG. 1 is a block diagram of typical time shared computer and remote terminal system employing the XY plotter of this invention.

Now refer to the drawing, FIG. 1, for an illustration of a typical computer installation employing the plotter of this invention.

Since the plotter is particularly adapted to use in time share computer systems it is illustrated in that environment which includes a central computer 10 which will have normally associated with it some interface device 11 suitable for interconnecting the computer into a conventional public or private telephone dial or teletype network 12. The network includes a plurality of remote stations and a transmission medium represented by the several arrows. The computer 10 may be connected via a line 13 to a representative remote terminal installation which includes a data set or acoustic coupler 14 for receiving digital data from the telephone line 13. Typically the remote installation will include as a primary utilization device, a teletypewriter 15, with one or more of its normal accessories including an automatic typewriter 15*a* for producing printed copy, a paper punch 15*b* and may include a paper tape reader 15*c*, all connected via an interface circuit 15*d* to the data set 14 over line 16.

A plotter 20 of this invention may be coupled directly via line 21 to the data set or acoustic coupler 14. Additionally, it may be interconnected to the teletypewriter 15 by input lead 22 and output lead 23.

Figures 6, 10:
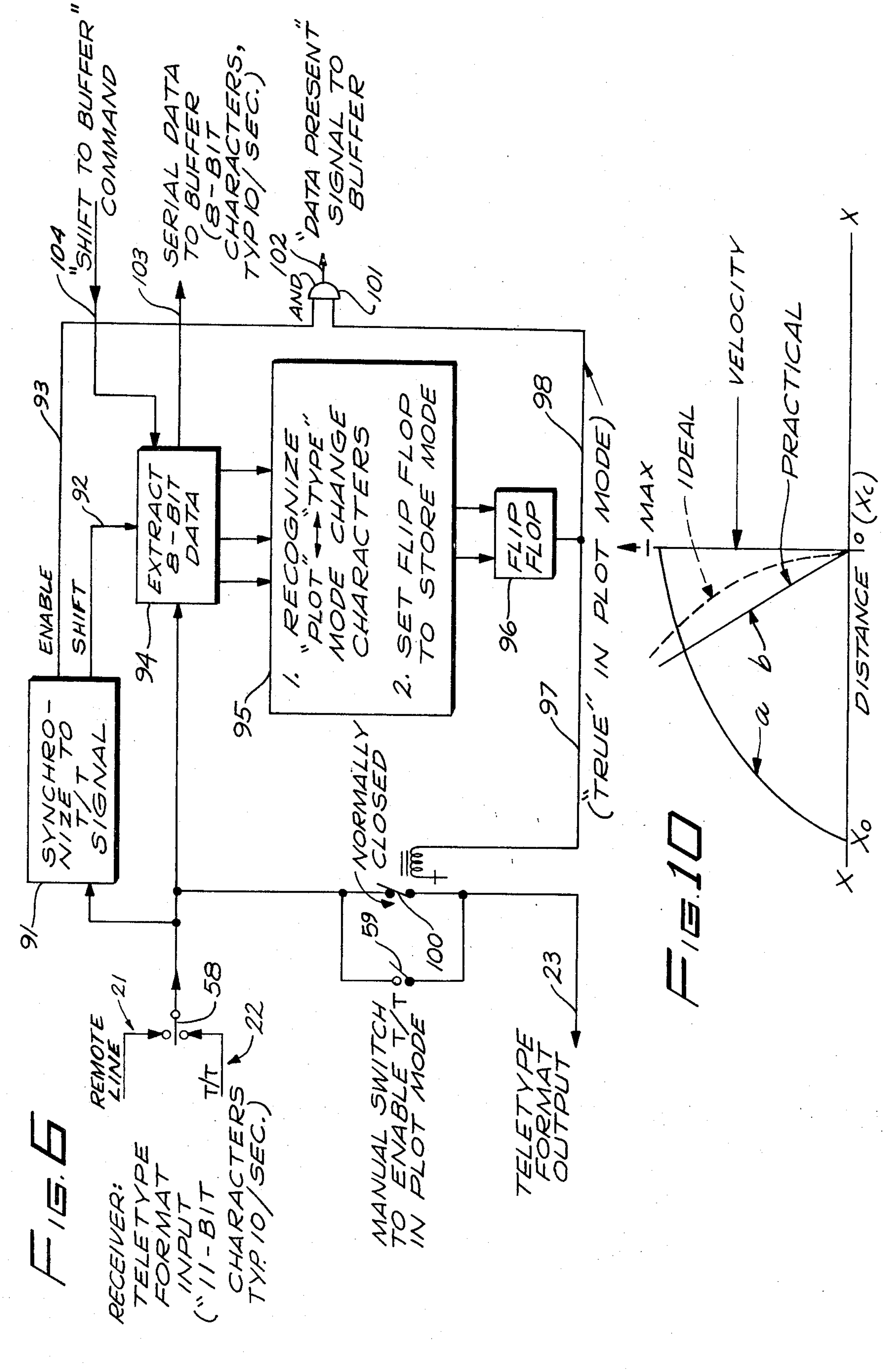
FIG. 6 is a block diagram of the receiver of FIG. 1.
FIG. 10 is a graphical representation of the pen velocity-distance to go characteristic of the plotter of this invention.

The plotter 20 includes a receiver 24 as an input device described in more detail connection with FIG. 6. Suffice it to say for the present, the receiver 24 introduces digital data received either over lead 21 or 22 into a buffer storage device 25 having, for example, a typical storage capability of 2,048 bits or 256 eight bit characters. The presence of the storage buffer 25 allows the XY plotter 20 to operate asynchronously with respect to the teletypewriter 15 and the computer 10. The information in the buffer storage device 25 is introduced in serial order into decoder and control circuit 30 on demand, which is explained in more detail in connection with FIG. 7.

Basically the decoder and control circuit 30 includes a command decoder 31 which segregates instructions contained in the received data from the actual data and after processing applies these to an X command register 32 and a Y command register 33 which produce the X and Y commanded positions to the pen of the plotter. These X and Y command signals are time multiplexed onto lead 34 and introduced into the X and Y servo circuit 35 of the X and Y axis drive and encoder system.

Figure 4:
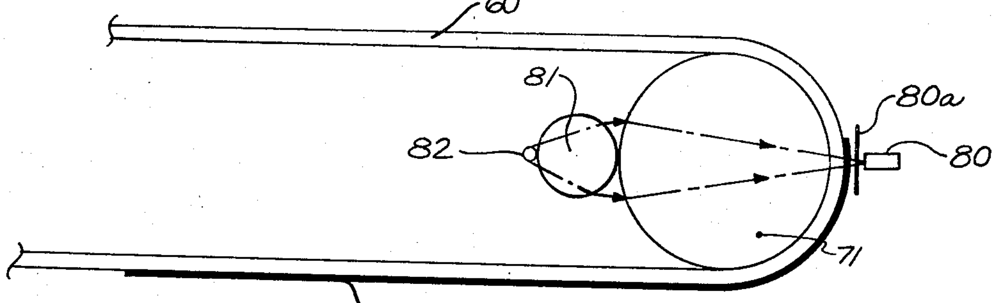
FIG. 4 is a simplified representation of the optical position readout system of this invention.
Figure 3:
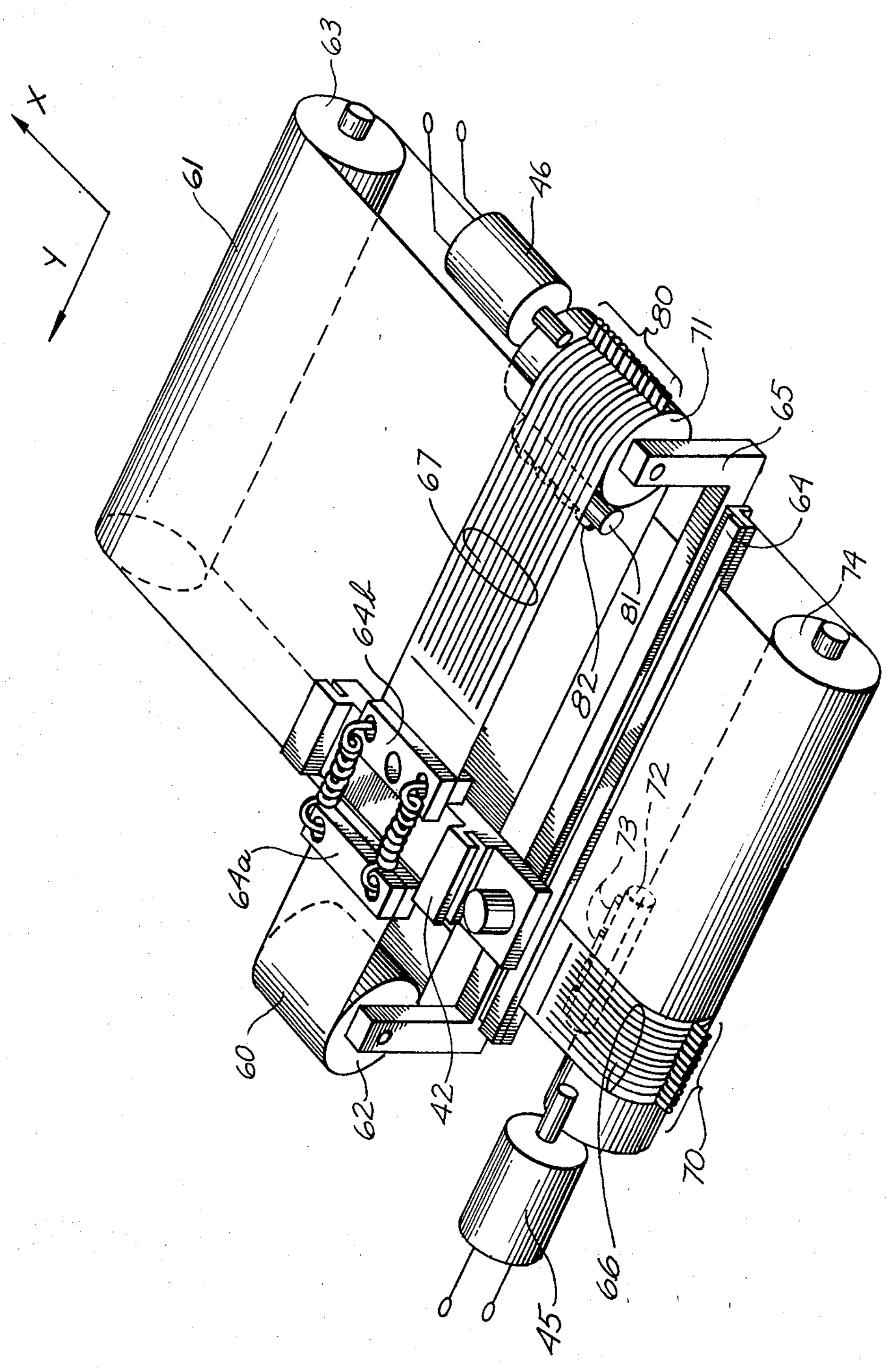
FIG. 3 is a perspective view of the pen drive mechanisms of the plotter of FIG. 1.

The command decoder 31 o the decoder and control circuit includes an additional output lead 36 to a pen drive solenoid 37 which operates to raise or lower a pen 40 into contact with a paper or other similar recording medium 41. The pen 40 is transported on a carriage 42 under the control of two drive systems, an X axis drive and optical encoder 43 and a similar Y axis drive and optical encoder 44. The drive systems and optical encoder are illustrated in FIGS. 3 and 4. Each of the drive and optical encoders 43 and 44 include two major components. Drive and position encoders 43*a* and 44*a* respectively and optical position pickoffs 43*b* and 44*b* respectively. In each case the drive and position encoder 43*a* or 44*a* is driven by he respective X or Y drive motor 45 or 46 under control of the XY servo circuit 35 while the optical position pickoffs 43*b* and 44*b* provide actual pen position to the XY servo circuit 35 via leads 47 and 48.

From the foregoing it may be seen that the plotter 20 in accordance with this invention includes:

- a receiver;
- a buffer for incoming data;
- a decoder and control circuit which provides X and Y commands for a pen carriage and up and down commands for the pen;
- a pair of drive and position encoder belts;
- a pair of optical position detection systems;
- a servo circuit to provide pen carriage position error correction commands; and
- a motor drive system.

Figure 2:
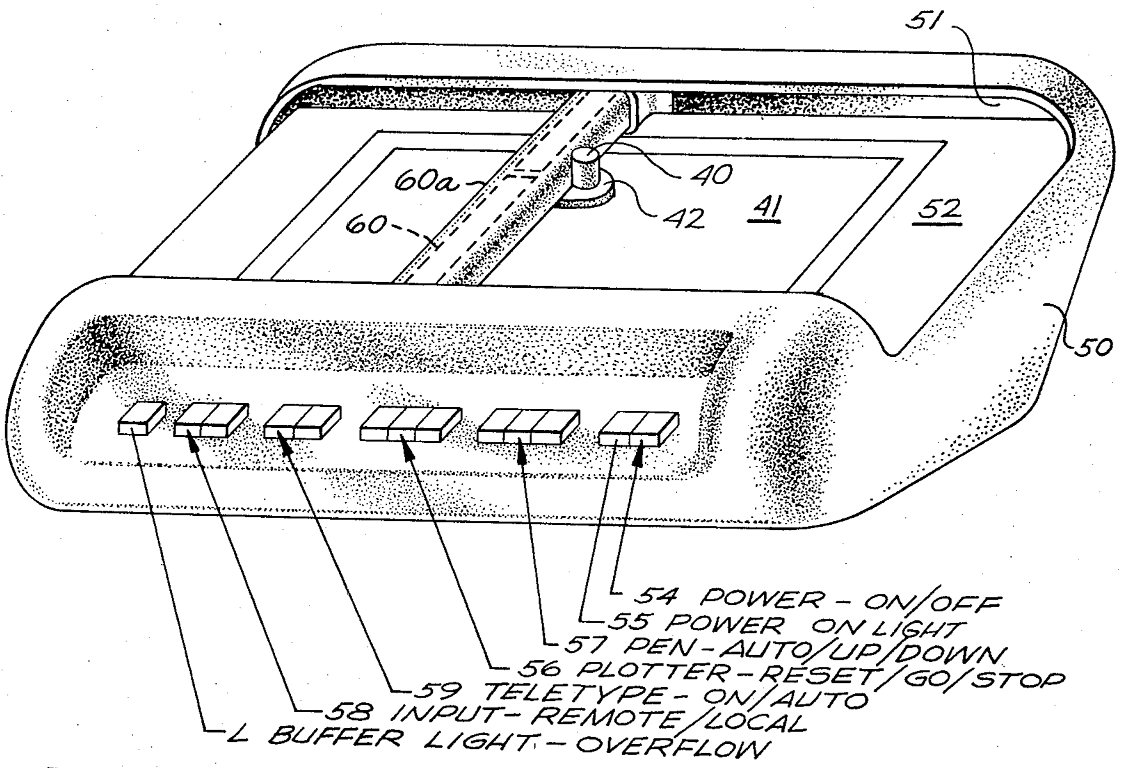
FIG. 2 is perspective view of the exterior of the plotter of FIG. 1.

The external arrangement of the plotter in accordance with this invention is illustrated in FIG. 2 as including a housing 50 containing the X and Y axis mechanical drive mechanisms, the optical position encoders and all electronic circuitry. The housing includes an opening 51 presenting a platen 52 upon which the paper or other material 41 to be used as a recording medium is positioned. It may involve roll material or continuously connected flat sheets with separating perforations which would be moved either automatically or under the control of the operator or it may employ single sheets of recording medium. Shown in the opening 51 is the Y axis transport mechanism constituting a belt 60 contained within a cover 60*a* carrying the carriage 42 and pen assembly 40.

The housing includes a number of function switches used by the operator to initiate and control the operation of the plotter. Included are a power switch 54 and a power indicator lamp 55. Two pen and carriage control switches are present on the control panel as well. They include the three position: "reset," "stop," "go," switch 56, and a three position: "auto," "up," "down," pen control switch 57. The switch 56 is used to enable the plotter by movement of the switch to the "go" position or to disable it when in "stop" position. Moving the switch to the "reset" position clears the buffer of unused commands. Through the use of switch 57 the pen may be manually placed in either the "up" or the "down" position, or in the "auto" made position which causes the pen to be under the control of incoming data.

There are two input mode switches 58 and 59 including a two position switch for connecting the plotter directly to the telephone data set 14 of FIG. 1 or to connect the plotter such that it may be operated from the local teletypewriter tape reader 15*c*. The switch 59 is used to enable the teletypewriter to operate during plotting operations which allows the paper tape punch 15*b* of FIG. 1 to record the plotting commands for re-use at a later time.

Indicator lamp L shows when the buffer 25 has been over-filled and data has been lost (buffer overflow).

BI-DIRECTIONAL DRIVE AND OPTICAL POSITION READOUT MECHANISM

For an understanding of the drive mechanism of the plotter, please refer to FIG. 3. The X axis drive motor 45 and the Y axis drive motor 46 drive belts 61 and 60 respectively via respective rollers 74 and 71. The two belts 60 and 61 are optically transparent or translucent flexible polymer material such as dimensionally stable polyester sheeting known under the trademark Cronar of the E. I. Dupont de Nemours and Company. Both ends of each drive encoder belt 60 and 61 are terminated by clamps for mounting purposes. The Y axis belt 60 is shown with clamps 64*a* and 64*b* in place, while only one of the X axis belt clamps, clamp 64*c*, is shown in FIG. 3. Each drive encoder belt 60 and 61 has one clamp rigidly affixed to a moving member; the Y axis clamp 64*b* rigidly affixed to the pen carriage 42 and the X axis clamp 64c is rigidly affixed to the Y axis carriage 65. The remaining ends of the XY axis drive encoder belts 60 and 61 are secured to the Y axis carriage 65 and the pen carriage 42 respectively via springs which afford both rotational and longitudinal freedom to each belt to allow for minor drive and return roller misalignments as well as belt stretch with changing environmental conditions (primarily heat and moisture). This technique avoids the problems inherent in an endless loop system by inserting a complaint member in the loop. The belts 60 and 61 include an unambiguious whole word optical pattern preferably Gray code on a number of parallel tracks 66 and 67 on one side thereof. The number of tracks depends solely upon the size of the plot or graph to be made and the desired digital resolution of the system. The optical system readout is such that these tracks 66 and 67 pass between the illumination system and the photocell arrays 70 and 80. The photocell arrays have a unique cell associated with each encoder track. Additionally, the photocell arrays are masked by a transparent slit which is not shown in FIG. 3. This slit mask appearing in FIG. 4 is mounted between the drive encoder belt and the photocell array and is aligned to the encoder pattern in order to facilitate an abrupt change in photocell illumination as a function of drive encoder belt motion to achieve the desired accuracy. The illumination system is comprised of an array of high intensity sub-miniature lamps 73 and 82, a cylindrical condensing lens 72 and 81, and a cylindrical field lens 74 and 71. The purpose of the illumination system is to supply the light energy for the photocells and to relay and concentrate that light on the optical pattern of the drive encoder belt which passes between the roller field lens and the slit mask over the photocell array.

The Y axis carriage 65 mounts the Y axis drive encoder belt 60, the Y axis drive motor 46, the pen carriage 42, the Y axis drive roller 71, the Y axis return roller 62, the Y axis illumination system, and the Y axis position readout photocell array 80 and slit mask (unshown in FIG. 3). The X axis rollers 63 and 74, the X axis light array 73, the X axis condensing lens 72, and the X axis photocell array 70 and slit mask are identical to their Y axis counterparts in function but may vary in size and number of parallel encoder tracks.

The two drive motors 45 and 46 are controllable independent of each other by the servo circuit 35 of the system. The motors 45 and 46 preferably are direct current motors operating continuously when current is applied to them.

In FIG. 3, neither the platen on which the recording medium is placed nor the recording medium itself are shown in order to clearly show the X axis drive and encoder system.

Figure 4A:
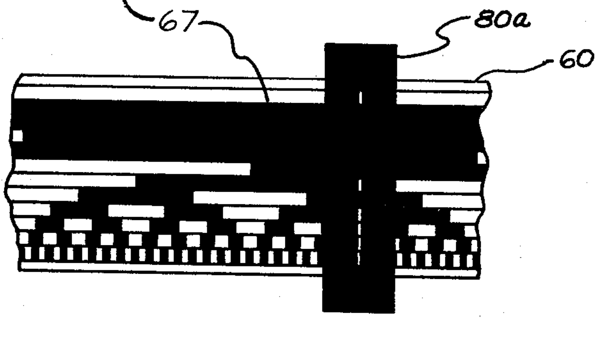
FIG. 4*a* is a fragmentary portion of a coding belt of FIGS. 3 and 4.

The optical encoding of the true pen position is illustrated in FIG. 4. The portion of the drive encoder belt 61 that passes in front of the photocell array slit mask 80*a* carries a pattern of opaque and translucent tracks 67 which are preferably photographically reduced and photographically impressed upon the outer surface of the drive encoder belt 61. FIG. 4*a* shows a section of a typical pattern 67 and slit mask 80*a* and illustrates a particular portion of the pattern showing through the slit. There may be, for example, 200 discrete coded positions per inch with each discrete position on the pattern having a unique code. The length of this pattern is equal to the desired X or Y axis pen travel and need not be the same for both axes. An array of high intensity sub-miniature lamps 82 and a cylindrical condensing lens 81 are positioned between the upper and lower bands of the drive encoder belt in order to be able to utilize the lens characteristics of the intervening roller 71. The lens system further serves to thermally isolate the high temperature lamp array 32 from the drive encoder belt 61 since sufficient heat is present to distort or damage the belt if the lamp array is placed in close proximity. Therefore, the cylindrical lens 81 in combination with the transparent roller 71 constitute a thermally isolating optical system for focusing the light from the lamp array 82 directly upon the photocell array slit mask 80*a* while maintaining the lamp array 82 at a safe distance from the drive encoder belt 60. Light from the lamp array 82 reaches the respective photocell 80 only when a translucent or transparent portion of the coding region 67 lies over roller 71 in front of the photocell array slit mask 80*a*. The drive encoder belt 61 as indicated previously constitutes the driving member for the pen carriage as well as an unambiguous whole word encoding device for establishing true pen position. Preferably the cylindrical condensing lens 81 is made of Pyrex glass and roller 71 is made of material having the proper optical properties to provide the focusing indicated in FIG. 4 by the dashed arrow lines. For example, the cylindrical condensing lenses 72 and 81 may be made from Pyrex glass and the cylindrical field lenses 71 and 74 may be made from polished clear polycarbonate.

OPERATION

Figures 5, 9:
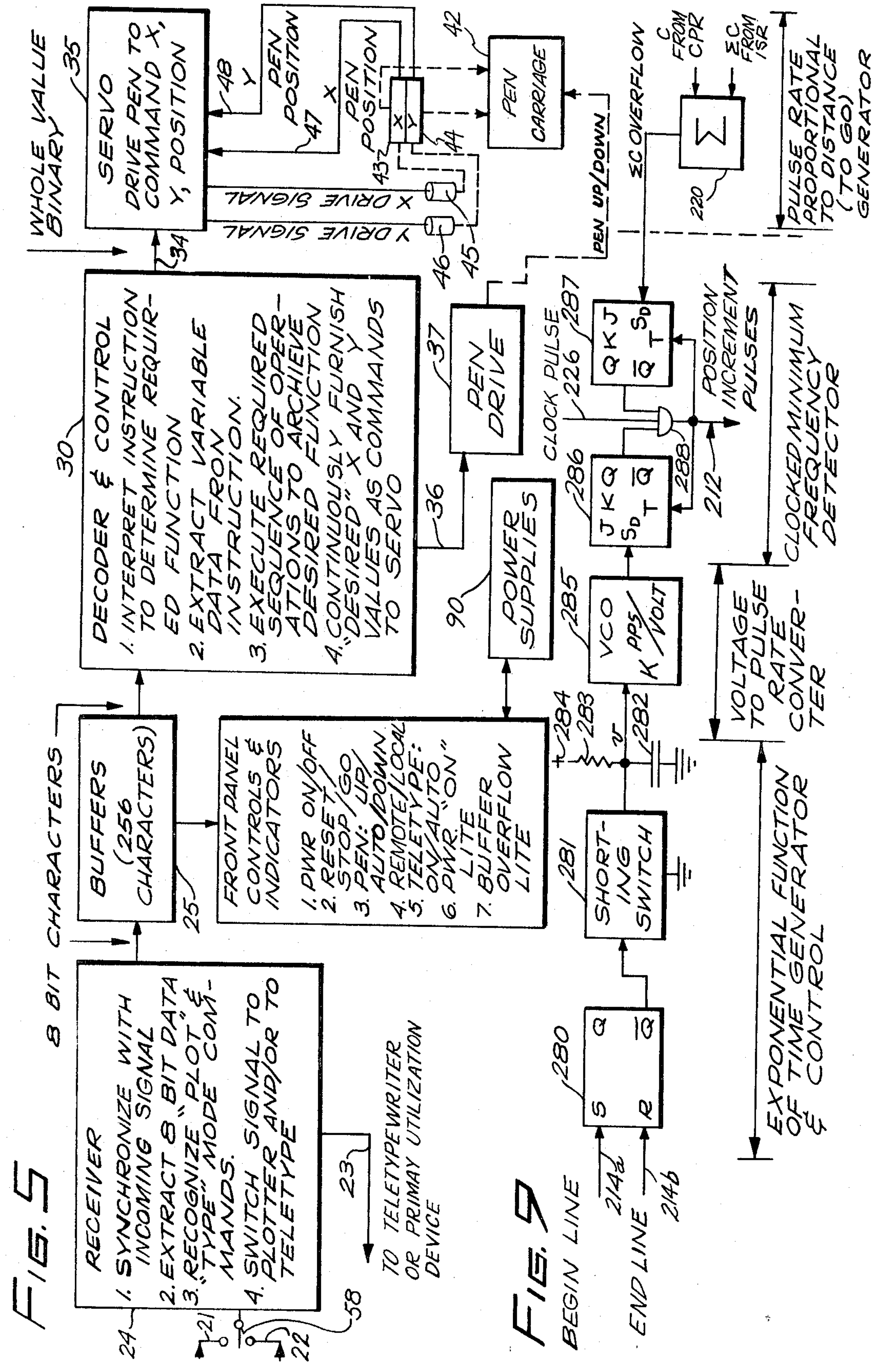
FIG. 5 is a functional block diagram of the plotter of FIG. 1.
FIG. 9 is a block diagram of the velocity profiler of this invention.

In order to understand the basic operation of the plotter as a whole your attention is directed to FIG. 5 which is a simplified block diagram illustrating the functions performed by each of the plotter elements shown in FIG. 1. Basically the two input lines to the plotter 21 and 22 are shown as alternately connectable to the plotter receiver 24 by switch 58 of FIG. 2 The receiver 24 first establishes synchronism with the incoming signal at the character rate of the data source. This synchronism is accomplished employing well known means in the receiver art such as the detection of code groups or marks in the data format as used. Next the receiver 24 extracts the eight bit characters and identifies the specific command characters intended to signal a change into the "plot" or into the "-type" mode of operation. In accordance with these commands, in the "plot" mode the receiver introduces the next following data into the buffer storage circuit 25, and in the "type" mode the receiver passes the received data over lead 23 to the teletypewriter 15 shown in FIG. 1.

The buffer storage circuit 25 receives eight bit characters in serial form asynchronously and stores them for serial introduction into the decoding control circuit 30. The buffer storage circuit 25 provides a signal to the front panel whenever the incoming data rate exceeds the data utilization rate of the plotter such that the storage capacity of the buffer circuit is exceeded or has "overflowed".

The decoder and control circuit 30 interprets the instructions received from the buffer storage circuit 25 and separates instructions from the variable data. It determines the sequence of operations required to plot the data in the minimum time and continuously furnishes X and Y commands to the servo circuit 35. The decoder and control circuit 30 additionally supplies a signal over lead 36 to the pen drive 37 for lowering and raising the pen from the recording surface. The X and Y commands to the servo 35 are time division multiplexed on a single lead 34 and the servo 35 must demultiplex the signals and compare the command signals with actual pen position in both the X and Y axes arriving over leads 47 and 48 from the pen X and Y axis drive and optical encoders 43 and 44. The servo circuit 35 further compares the commanded and actual position of the pen carriage, and generates drive signals which are applied to the respective motors 45 and 46 which are mechanically coupled to the X and Y drive systems 43 and 44. This causes the pen carriage 42 of FIGS. 1–3 to move in such a direction and at such a rate so as to reduce the difference between the commanded and actual pen position to essentially zero in the least possible time within hardware limitations.

A power supply system 90 under the control of the front panel supplies total operating power to all of the circuit and operations described above.

RECEIVER

Now refer to FIG. 6 where the implementation of the receiver 24 may be seen. It includes a synchronous detector 91 which receives incoming data from either the remote input line 21 or the teletypewriter input line 22 via switch 58 and produces a synchronous shift signal on lead 92 when the receiver is in synchronism with the data source. An eight bit shift register 94 stores data received via switch 58 and at the appropriate time will pass it to a matrix 95 which recognizes plot/type mode change characters. This may be a core, transistor or other similar type of digital code recognition circuit. Whenever a signal of the "plot" type is present, circuit 95 applies trigger pulses to flip-flop 96 which in turn produces an enabling signal on leads 97 and 98. The signal on lead 97 opens the normally closed switch 100 thereby stopping the introduction of data into the teletypewriter via lead 23, assuming that manual switch 59 is open. Lead 98 constitutes one enabling input to AND gate 101 with the second input over the synchronous detector enable lead 93. Lead 93 has an enabling signal thereon whenever an eight bit character is received and stays in that condition long enough for serial data to be passed from the shift register 94 to the buffer storage circuit 25 of FIGS. 1 and 5 over lead 103. With the coincident inputs to AND gate 101 a signal over line 102 is passed to the buffer circuit 25 to enable the buffer circuit 25 for receipt of serial data over lead 103. The receiver 24 is also under the command of buffer circuit 25 over lead 104 which supplies the actual shift signals in response to the data present signal on lead 102. As indicated above the buffer storage circuit 25 comprises basically a several character capacity memory.

DECODER AND CONTROL CIRCUIT

Figure 7:
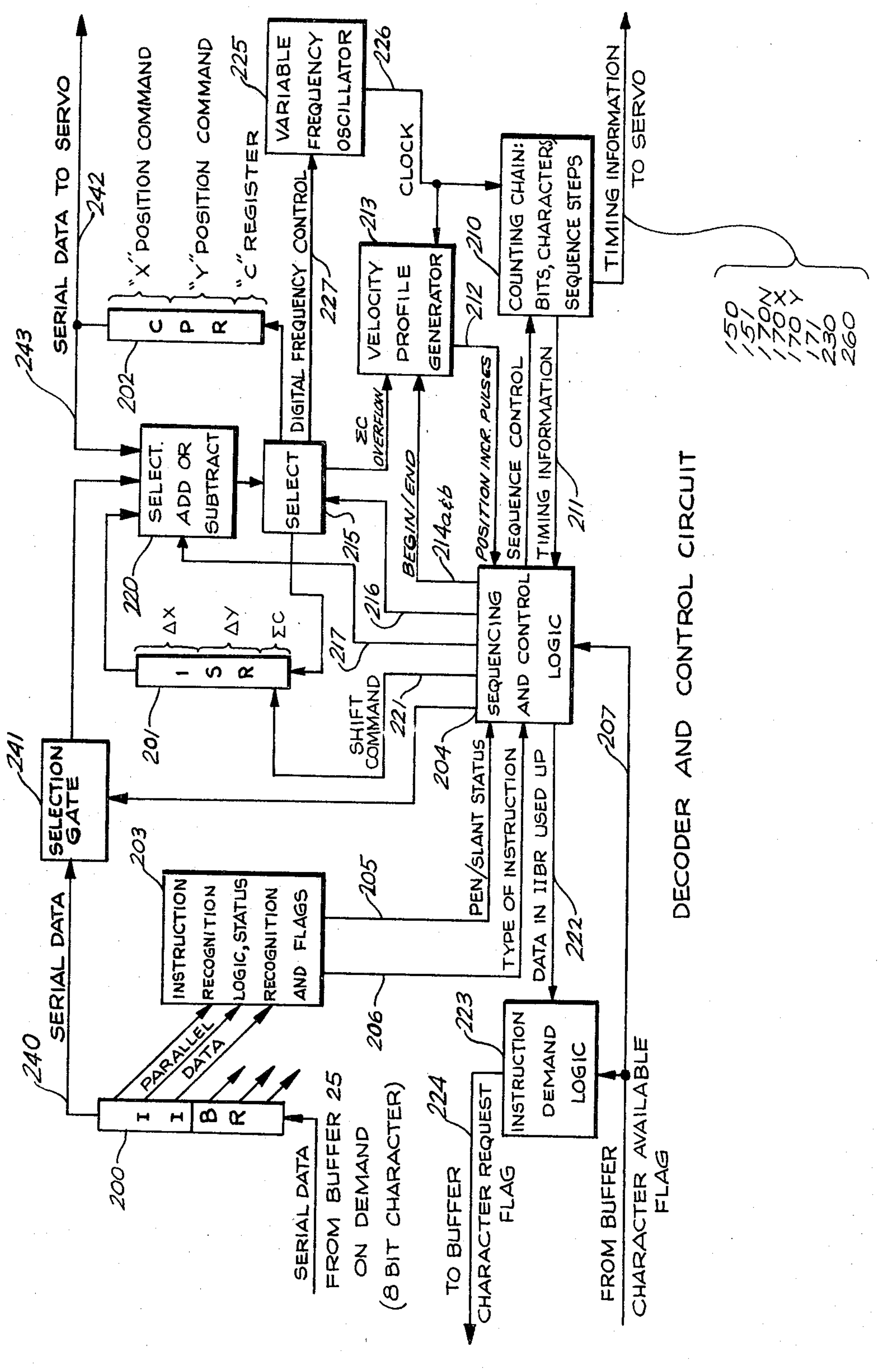
FIG. 7 is a block diagram of the decoder and control circuit of FIG. 1.

The decoder and control circuit 30 shown in FIG. 7 includes three shift registers. The first, termed the Incoming Instruction Buffer Register (IIBR) 200 provides for serial to parallel conversion of data from the buffer 25. A second shift register 202 termed the Commanded Position Register (CPR) stores both the actual X position command and Y position command and also information termed C which is proportional to the difference between the present position and the required new (whole value) position of the pen. The Commanded Position Register 202 maintains the current command position at all times regardless of the actual position of the pen 40 and its carriage 42. A third shift register called the Intermediate Storage Register (ISR) 201 includes three sections: one for storing commanded incremental changes in X position termed $\Delta X$, one for commanded incremental changes in Y position termed $\Delta Y$, and the third section termed $\Sigma C$ which is used as the accumulator for the time integral of C (which integral is truncated because of the finite length of the register). The overflows of $\Sigma C$ are useful as described later for pen velocity control In addition to these shift registers, there are a number of logic circuits the first of which, the logic and recognition network 203, is connected to receive parallel data from the Incoming Instruction Buffer Register 200 and through techniques well known in the art recognize instruction characters and maintain status information. The logic network 203 provides input commands to a second logic network 204. Pen position orders and slant mode of operation status signals are applied over lead 205 to the sequencing and control logic 204 while the type of instruction is introduced over lead 206. The sequencing and control logic also responds to flag signals from the buffer 25 over lead 207 indicating that a character is available in the buffer 25, timing pulses from a counter 210 over lead 211, and position increment pulses over lead 212 from velocity profile generator 213 described in more detail in connection with FIGS. 9 and 10.

The sequencing and control logic of circuit 204 supplies both a "begin line" and "end line" signal to the velocity profile generator 213 over leads **214*a* and 214*b*, enabling pulses to a select logic circuit of 215 over lead 216 and a similar enabling pulse on lead 217 to a select add or subtract logic network 220. The sequencing and control logic network 204 also supplies shift command signals to the Intermediate Storage Register 201 over lead 221 and a signal over lead 222 to instruction demand logic network 223, indicating that the Incoming Instruction Buffer Register is open. This latter network responds to a signal over lead 222 by applying a character request signal over lead 224 to the buffer 25 of FIG. 1. The timing of the entire decoder and control circuit 30 is determined by clock pulses over lead 226 which are provided by variable frequency oscillator 225 which, in turn, is controlled by the digital control signals of the select network 215 over lead 227. Timing information for the servo circuit is derived from the variable frequency oscillator 225 via lead 226 and the counter 210 over leads 150, 151, 170N, 170X, 170Y, 171, 230 and 260 to the servo circuit 35**.

The variable data stored in the Incoming Instruction Buffer Register is applied in serial form over lead 240 through a selection gate 241 to the select add or subtract network 220. The actual X and Y position commands of the shift register 202 are applied via lead 242 to the servo circuit of FIG. 8, and via lead 243 to the select add or subtract network 220 for updating.

DIGITAL SERVO CIRCUIT

Figure 8:
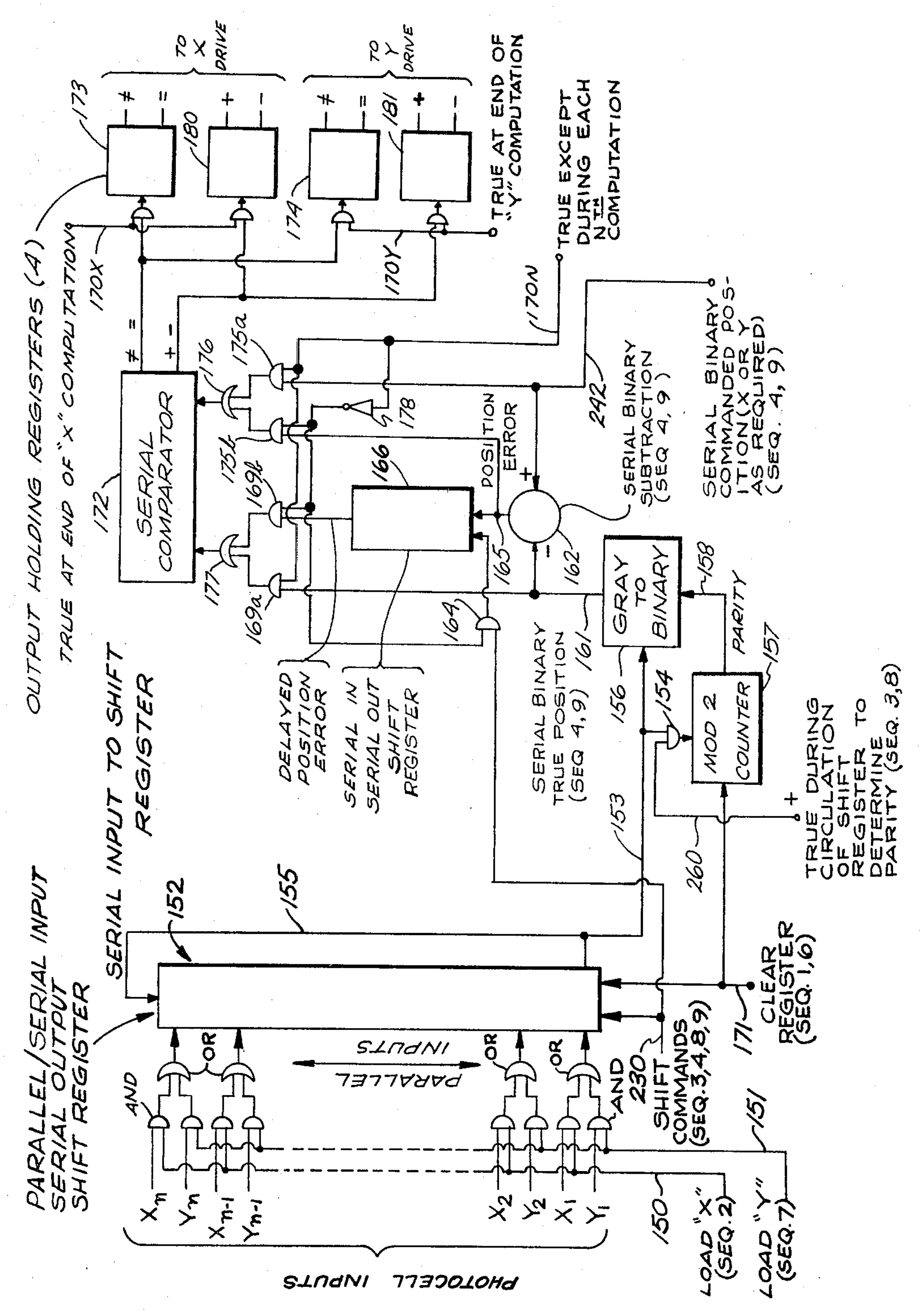
FIG. 8 is a block diagram of the X and Y servo circuit of FIG. 1.

Now referring to FIG. 8, the digital servo circuit 35 may be seen as including $X_1$ through $X_n$ photocell inputs from the X drive and encoder system 43 of FIG. 5 and $Y_1$ through $Y_n$ photocell inputs from the Y drive and encoder system 44 also of FIG. 5. Each of the X photocell inputs is applied as one enabling input to a respective AND gate with a common second input over lead 150. Similarly each of the Y photocell inputs has a respective AND gate with a common second input for each of the Y AND gates s over lead 151. Each pair of X and Y AND gates are in turn connected to common OR gates constituting the parallel input to a shift register 152. The shift register 152 is cleared by a signal on lead 171 from the decoder and control circuit 30 just prior to inputting the X or Y photocell data. Shift commands to the shift register 152 arrive over lead 230 from the decoder and control circuit 30. Serially shifted bits in the shift register 152 are extracted at lead 153 and are applied simultaneously to an AND gate 154 and a Gray to binary code converter 156 while being recirculated to the shift register via lead 155. During this operation the output of the Gray to binary code converter is ignored. A second input to the AND gate 154 arrives over lead 260 from decoder and control circuit 30, enabling the mod 2 counter 157 to determine the parity of the photocell data. The parity is transmitted to the Gray to binary code converter 156 over lead 158. Shift commands are again applied to shift register 152 as above and during this operation, the position of the pen carriage in either the X or Y axis is obtained in natural serial binary on lead 161 at the output of the Gray to binary converter 156. It is used in the following two ways: first, during all but one of each N computations the enabling signal 170 N is "true" and the binary position information on lead 161 is routed via AND gate 169a and OR gate 177 to the serial comparator 172. Simultaneously, the commanded position on lead 242 is routed to comparator 172 via gates 175a and 176. The comparator 172 determines whether the actual position equals the commanded position ("=") or not (" ≠ "), and if they are unequal, it determines also whether the commanded position is greater ("+") or smaller ("–") than the actual position. In the case of an "X" computation, the equality an sign information thus obtained is sampled by means of a pulse on lead 170X and held in registers 173 and 180, respectively, which in turn control the magnitude (ON–OFF) and polarity of the drive voltage applied to the "X" motor 45. In the case of a "Y" computation the sampling pulse is on lead 170Y and registers 174 and 181 hold the information for the "Y" motor 46. Second, during the remaining one of each N computations, the actual position on lead 161 is subtracted from the commanded position 242 by means of a serial binary subtracter 162 to obtain the binary position error on lead 165. Shift register 166 is connected as a delaying element for the incoming position error on lead 165 such that as the position error is being generated and stored in 166, the delayed position error (generated N computations previous) is being shifted out of 166 to AND gate 169b. Shift commands are provided to shift register 166 only during each Nth computation by conjunction of the appropriate signals on leads 230 and 170N in AND gate 164. During this process the enabling signal on lead 170 N is "False" and is inverted by inverter 178 so that gates **169*b*, 177, 175*b* and 176 route the current position error and the delayed (past) position error to the comparator 172 which, with the appropriate sampling signal 170X, 170Y and holding registers 173 and 180 or 174 and 181, control the X and Y motor as discussed above. In this case the use (comparison) of current and past error constitutes a measurement of error rate and its use to control the motor(s) is therefore a form of rate feedback, resulting in improved servo performance. The proper timing of each of these steps is accomplished by signals from the decoder circuit 30**. The sequence steps of operation of the servo circuit are as follows:

1. Clear shift register.
2. Load "X" photocell signals into shift register.
3. Circulate to determine parity.
4. Circulate Gray code into a serial Gray to binary converter, simultaneously compare the result to the incoming commanded "X" position.
5. Sample result of comparison and place into "X" holding registers.
6. Clear shift register.
7. Load "Y" photocell signals into shift register.
8. Circulate to determine parity.
9. Circulate Gray code into a serial Gray to binary converter, simultaneously compare the result to the incoming commanded "Y" position.
10. Sample result of comparison and place into "Y" holding registers.

Every Nth computation:

4.,9. Subtract output of Gray to binary converter from commanded position, store result in shift register and also compare result to previous result which was stored in shift register. 5.,10. Sample result of comparison and place into "X," "Y" holding registers.

VELOCITY PROFILER

In a digital position system of the type here disclosed the variation of pen position is necessarily achieved one "bit" at a time, and the rate of pen position change (velocity) is proportional to the rate of accumulation of "bits," or, if the "bits" are all in the same direction, the velocity is proportional to the rate of occurrence of the "bits." For example, 3 inches per second velocity in a system with 200 bits per inch corresponds to 600 bits per second. Further, it is relatively simple in a digital system to arrange that each pulse of a pulse train add one bit to a (position) number (i.e., a counting operation). Therefore, it is possible to use the repetition rate or frequency of a pulse train to control the "velocity," or rate of change, of position commands held in a register.

The operational characteristic of the velocity profiler is illustrated in FIG. 10 with the pen assembly commencing at $X_0$ with command to go to position 0. The natural velocity increase of a DC motor with maximum applied voltage has the same functional form as the voltage on a capacitor charging through a resistance. This desired increasing velocity profile is shown as curve *a* of FIG. 10. Therefore, an analog voltage corresponding to the desired velocity is easily obtained through the use of an R-C circuit. Using this analog voltage as the input to a voltage controlled oscillator produces a pulse train proportional in repetition rate to the desired increasing velocity. Hence a proper pulse source is easily obtained.

The deceleration curve could be obtained in a similar way, but there is difficulty in picking the time to start decelerating and also the mathematics would have to be precise in order for the velocity and position error to become zero at the same time. Therefore it is preferable to base the deceleration curve on measured distance to go. In those terms, the control law is quite well approximately by the ideal curve, $$v_{(x)} = \sqrt{2bVmax}\sqrt{_c - X},$$

which is unfortunately difficult to implement with simple hardware because of the square root. A practical compromise is to use curve *b* of FIG. 10 where $V_{(x)} = K(X_c - X)$. The deceleration time is longer than in the ideal case but is comparable to, or shorter than, the acceleration time.

A suitable measure of Xc-X already exists in the plotter in the form of the number $C$, in the register 202 of FIG. 7. This value $C$ is initially determined in the process of normalizing the larger of either $\Delta X$ or $\Delta Y$ in shift register 201 of FIG. 7 to a value less than 1. Thus it is related to the distance to go. Just prior to drawing a line, the value of $C$ is $C_0 = 2^P$, and is equal to or just greater than the true distance to go, $D_o$. It is such that $$D_o = 2^P \Delta X = C_o \Delta X X$$

where $P$ is an integer selected such that $\Delta X$ is a fraction with a value between ½ and 1. Note that $C_o$ is always positive. Now, if each velocity pulse causes $\Delta X$ to be added to $X$ (which may or may not at that instant cause the integer part of $X$ to change, since $\Delta X$ is a fraction) and also causes the value of 1 to be subtracted from $C$, we have:

a. The entire value of $D_o$ will have been accumulated into $X$ at exactly the same time as $C$ is decremented to zero.

b. The value of $C$ is always proportional to the remaining distance to go.

Given the digital number, $C$, it remains to generate a pulse train with frequency proportional to the value of $C$. This is achieved by repetitively adding $C$ to a number stored in a register called $\Sigma C$ and converting the overflows into pulses. For example, if the $\Sigma C$ register has a maximum capacity of $2^M$, it will overflow (on the average) after $C$ has been added in $2^M/C$ times; if the addition is every $\delta_t$ seconds, the overflows occur every $2^M\delta_t C$ seconds, or at a rate of $f = C/2^M\delta_t$. Thus, to implement the control law $V_{(x)} = K(X_c-X)$, we can easily obtain a pulse train by using $$C-(X_c-X) \text{ and } K = 1/2^M\delta_t$$

with appropriate values of $M$ and $\delta_t$.

The above demonstrates the method for generation of pulse trains for both acceleration and deceleration of the pen drive circuits. It remains to select the correct profile and switch to the other at the appropriate time. This is done by the design and use of a minimum frequency selector. Simply stated, this is a device which generates an output pulse only after at least one pulse is received from each of the input pulse sources. Thus it always has to wait on the slower of the inputs.

The velocity profiler function is accomplished employing the circuitry of FIG. 9 having the operating characteristics shown in FIG. 10.

It comprises basically an exponential function generator including a multi-vibrator 280 which when triggered operates a shorting switch 281 to ground both plates of a capacitor 282. The capacitor 282 is connected with one plate to ground and the other through a load resistor 283 to a voltage source 284. This combination provides an exponentially rising voltage $v$ when a "begin line" pulse is received by the multivibrator 280 over lead 214*a*. The voltage $v$ constitutes the control voltage for a voltage controlled oscillator 285 which acts as a voltage to pulse rate converter.

Voltage controlled oscillator 285 drives the "set" input of flip-flop 286. The "set" input of a second flip-flop 287 is driven by the $\Sigma C$ overflow pulses which have a repetition rate proportional to distance to go. The $\Sigma C$ overflow pulses are generated by adding $C$ from the Commanded Position Register 202 of FIG. 7 to $\Sigma C$ from the Intermediate Storage Register 201 of FIG. 7 in the select add or subtract network 220 of FIG. 7 and FIG. 9, and then converting overflows to pulses. The flip-flops 286 and 287 together with AND gate 288 which has a third input of clock pulses via lead 226 comprises a minimum frequency detector with output pulses termed "position increment pulses" appearing on lead 212. The operation of the minimum frequency detector is as follows.

A pulse input from the voltage controlled oscillator 285 causes the flip-flop 286 to be set to the "true" state. Additional pulses from the voltage controlled oscillator 285 have no effect until such time that the flip-flop 286 is reset by an output pulse on lead 212 from AND gate 288 via feed back as shown in FIG. 9. The same is true of the flip-flop 287 which is set by $\Sigma C$ overflow pulses. However, an output pulse from AND gate 288 can occur only when both flip-flops 286 and 287 are in the "true" state and when a clock pulse is present on lead 226. Thus the minimum frequency detector has an output pulse only when at least one pulse has been received from each of the two "set" pulse sources, hence, the detector always waits on the slower of the two pulse sources and is thus slaved to it. The use of the clock pulse assures that the output pulse occurs at the proper time during the computation cycle, and it also bounds the output rate at the clock rate of the system.

With the three inputs to the AND gate 288 as described above the velocity of the pen under the control of the velocity profiler is first determined by the buildup of pulses in the flip-flop 286 until it reaches a value corresponding to the intersection of curves $a$ and $b$ of FIG. 10. The velocity then decreases proportional to distance to go as determined by the $\Sigma C$ overflow pulses operating the flip-flop 287.

The above described velocity profile generator makes possible the operation of the drive motors at near optimum rates which increase as a function of time and decrease as a function of the distance to go. In this manner as the distance to go becomes small, the pen rate decreases proportionately, avoiding the problem of overshoot at the end point of the line. The combination of these two digital techniques allows optimal control of the pen at all times.

SUMMARY

The foregoing specification describes a graphical recorder having a number of advances over the prior art and for purposes of clarity the most significant of these advances are cataloged below:

1. The system is an all digital graphical plotter using a digital servo feedback loop.
2. The system employs a pair of belts, one for each of the *X Y* axis.
3. The dual belts of (2) above carry digitally encoded position information as well as being the carrier for the writing assembly.
4. The belts include a compliant member for eliminating any backlash, misalignment, and environmental problems with respect to the belt and writing assembly.
5. The true position of the writing assembly is read out in digitally encoded whole word form at all times from the belt.
6. The system includes buffer storage of incoming data allowing operation of the recorder asynchronously with respect to incoming data rates.
7. The novel optical system for the transport belts employs belt rollers as optical members of the system.
8. The recorder includes a velocity profiler for controlling the velocity of the pen writing assembly as a function of both time and distance to go to obtain optimum performance.

The foregoing is a description of one embodyment of this invention and that single embodyment shall not be considered as limiting. It is recognized that one skilled in the art could by following the teaching of this invention produce certain of the features or through different arrangements provide a recorder having different appearance without departing from the spirit and scope of this invention. Therefore, the monopoly afforded shall be determined instead by referring to the following claims.

We claim:

1. A graphical plotter comprising:

means for receiving digital information indicative of a plot to be recorded;

means for generating X and Y command signals for the plotter from the received information;

a writing assembly;

servo means for driving the writing assembly in the X and Y axes in response to X and Y command signals:

digital coded means for detecting the actual position of the writing assembly in the X and Y axes;

means responsive to detected actual position of the writing assembly for generating signals representative of the actual writing assembly position for feedback to said servo means;

said X and Y command signal generating means including buffer storage means for storing a number of whole words of data;

intermediate storage means for receiving data from said buffer storage on a word by word basis including instructions;

means connected to said intermediate storage means for distinguishing between instructions to move to an absolute position and instructions to move a specified distance;

means responsive to instructions to go to an absolute position for comparing the address of the new instructed absolute position with the signal representative of present pen address position to determine a required delta position change value; and means responsive to instructions to move a specific distance to apply said delta position change value to said servo means for said writing assembly.

2. The combination in accordance with claim 1 wherein said actual pen position detecting means includes first belt means carrying the writing assembly in the X direction and second belt means carrying said first belt means and writing assembly in the Y direction, both of said first and second belt means having photo optical patterns thereon unique to each respective X and Y position of the writing assembly.

3. The combination in accordance with claim 2 wherein said writing assembly position detecting means comprises light source means on one side of said belt means and light detecting means on the opposite side of said belt means and including transparent roller means for said belt means with said light source means positioned adjacent to said roller means whereby said transparent roller means focuses energy from said light source means on said light detecting means.

4. In a graphical plotter system for operation in conjunction with a data utilization device such as a teletypewriter under the control of a remote source of digitally coded serial blocks of information comprising:

switching means for alternately connecting a graphical plotter and a date utilization device to the remote source of information;

said graphical plotter including:

a receiver for segregating blocks of information arriving from the remote source;

buffer storage means;

said receiver including means for recognizing signals indicative of commands to plot;

and including means for enabling the buffer storage means to receive a plurality of blocks of information;

decoder means connected to the buffer storage means for generating two-axis discrete commands;

a writing assembly;

means mounting the writing assembly for movement along two axes corresponding to the commands of said decoder means;

means for detecting the actual position of the writing assembly along each of the axes;

servo means for comparing the two discrete commands with the actual writing assembly position and for generating a control signal which is a function of the positional error detected;

and continuous drive motor means driven by the last means for moving the writing assembly to reduce the positional error to substantially zero.

5. The combination in accordance with claim 4 wherein said receiver includes means for recognizing signals indicative of commands to type and further includes means for passing the blocks of information following such recognition to the teletypewriter without loss.

6. The combination in accordance with claim 4 wherein said buffer storage means includes means for automatically indicating loss of data due to the incoming data exceeding the buffer storage means' full storage capacity.

7. The combination in accordance with claim 4 wherein said buffer storage means includes means for enabling the decoder circuit when at least one block of information is stored therein.

8. The combination in accordance with claim 4 wherein said plotter includes timing means for generating operating sequence information independent of the rate of data arrival at the plotter.

9. The combination in accordance with claim 4 wherein said plotter includes means responsive to the magnitude of the positional error for controlling the velocity of the writing assembly.

10. The combination in accordance with claim 4 wherein said means for detecting actual position of the writing assembly includes an optical coding means constituting the carrier for the writing assembly.

11. The combination in accordance with claim 4 wherein said means for detecting actual position of the writing assembly comprises an optical coding belt having a unique code for different incremental positions and optically responsive means for detecting each unique code.

12. The combination in accordance with claim 11 wherein said optical coding belt includes a plurality of coding tracks and detector means for each track whereby actual position of the coding belt may be detected at any time.

13. The combination in accordance with claim 11 wherein said detecting means includes a source of light, means for concentrating the light on the optical coding belt and photo responsive means.

14. The combination in accordance with claim 13 whereby said light concentrating means includes an optically transmissive belt roller.

15. A digital plotter including:

a platen for supporting a recording medium;

a writing assembly positioned to record on the medium;

drive motor means for moving the writing assembly to commanded positions;

means for generating command signals for said drive motor means;

said command signal generating means including means for determining the distance to go of the writing assembly from its commanded position;

means responsive to the distance to go for continuously decreasing the speed of said drive motor means as a function of distance to go of the writing assembly while said writing means is recording on said medium;

said last means including storage means for storing a value related to the larger of either distance to go in the X or Y direction; and means for limiting the maximum velocity of the said drive motor means as a function of said larger distance.

16. The combination in accordance with claim 15 wherein said motor speed controlling means includes circuit means for generating an increasing velocity profile as a function of time and a decreasing velocity profile as a function of distance to go of the writing assembly.

17. A combination in accordance with claim 16 wherein said motor speed controlling means comprises a minimum value detector which compares the said velocity profiles and controls the motor speed to the lesser of the two.

18. Plotting apparatus comprising:

a platen surface;

a first carriage mounted for movement in one direction across said platen surface;

a second carriage mounted on said first carriage for movement in a second direction across said platen surface;

a writing assembly secured to said second carriage and positioned to write on said platen surface;

motor means for driving said first and second carriages;

optical position encoding means for said first and second carriages for indicating the position of said writing assembly in both said directions, said optical position encoding means comprising:

individual flexible record means mounted to travel with respective carriages and including light transmissive and light blocking regions;

cylindrical transparent rollers mounting said respective flexible record means for movement over said roller;

photo responsive means directed toward said flexible record means in the region of said rollers to detect light transmission through discrete areas of said flexible record means;

a light source on one side of each of said rollers directed toward said flexible record means through said transparent cylindrical rollers;

said rollers constituting the field lens of an optical system including said light source and photo responsive means;

said flexible record means comprising a pair of belts of translucent material with patterns of opaque areas on selected regions uniquely related to the longitudinal positions of said belts;

one of said belts mounting said second carriage and the second of said belts mounting said writing assembly.

* * * * *